Dec. 27, 1927.  
F. B. McKINNEY  
AUTO BRAKE TESTING DEVICE  
Filed Oct. 6, 1925

1,654,136

2 Sheets-Sheet 1

WITNESSES

INVENTOR

Dec. 27, 1927.
F. B. McKINNEY
1,654,136
AUTO BRAKE TESTING DEVICE
Filed Oct. 6, 1925   2 Sheets-Sheet 2
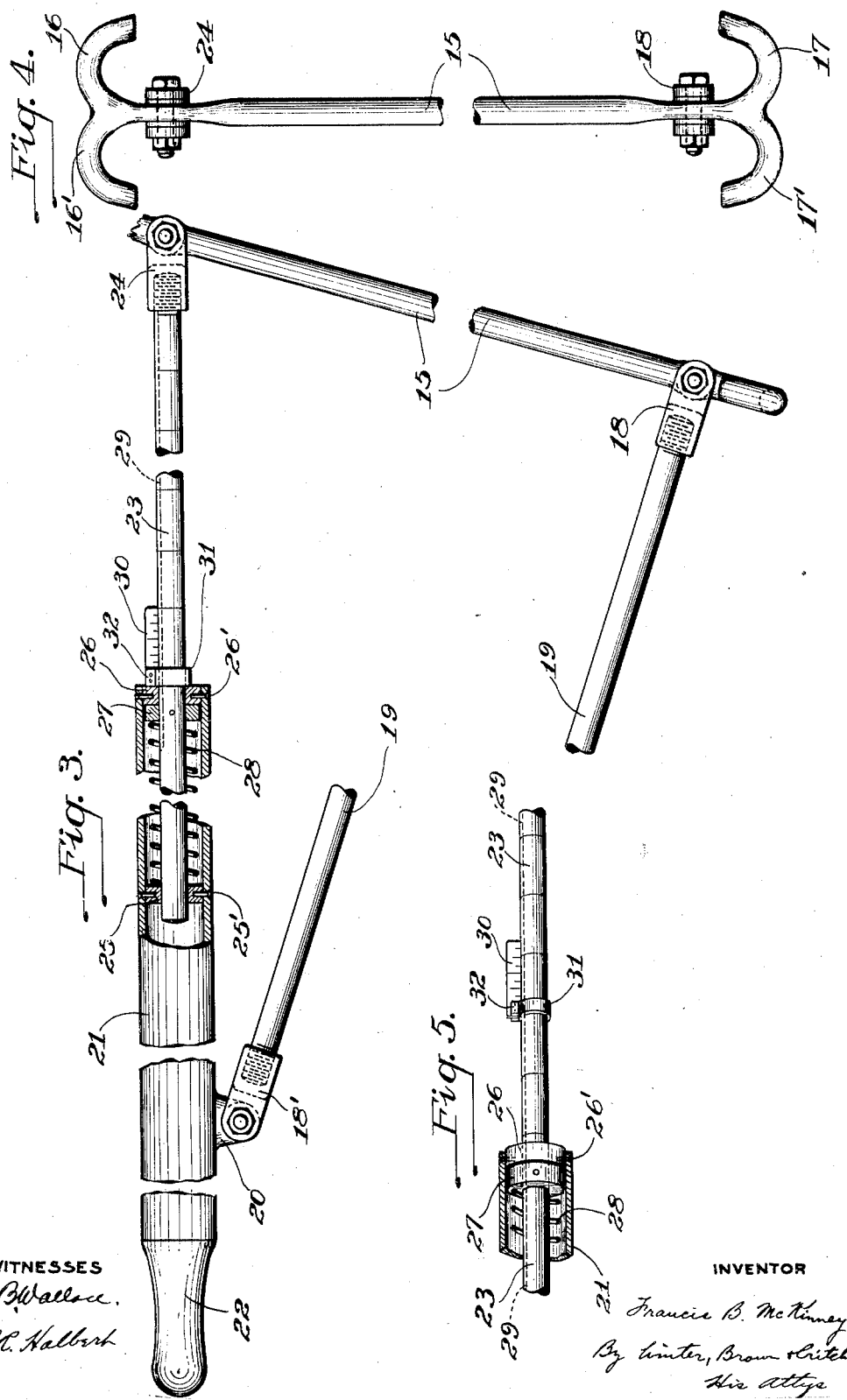

Patented Dec. 27, 1927.

1,654,136

UNITED STATES PATENT OFFICE.

FRANCIS B. McKINNEY, OF BALDWIN TOWNSHIP, ALLEGHENY COUNTY, PENNSYLVANIA, ASSIGNOR TO AUTO BRAKEOMETER CORPORATION, OF PITTSBURGH, PENNSYLVANIA, A CORPORATION OF PENNSYLVANIA.

AUTO BRAKE-TESTING DEVICE.

Application filed October 6, 1925. Serial No. 60,850.

This invention relates to testing devices, and particularly to a device for determining the relative braking effects of the several brakes of an automobile or other similar vehicle.

Heretofore, considerable difficulty has been experienced in setting the brakes used in conjunction with the oppositely disposed wheels of a vehicle so that upon actuation they will secure substantially the same braking action, as well as setting the front and rear wheel brakes so as to produce the desired relative braking effects.

It is an object of the invention to overcome the disadvantages heretofore encountered, and to provide a simple, convenient, and effective means for quickly determining the braking effects on the several wheels of the vehicle, one which is substantially foolproof in the hands of operators, and one which can be manufactured at a nominal cost.

It is a special object to provide a device of the character referred to which can be readily and quickly applied and removed during use from the wheels of the vehicle without in any way necessitating a rearrangement of the braking mechanism proper, one equipped with means adapted to automatically set a movable gage indicating the brake resistance of the particular brake being tested, said gage maintaining its setting after release of the power applied to secure the intended actuation of the device.

It is still a further special object to provide a brake testing device containing but a few parts and light in weight, so that it can be easily carried from place to place, in which the calibrated rod and cooperating tube forming the side of variable length of the triangular shaped frame, constituted by the side frame members of the construction, are effectively guided for easy sliding movement one within the other, in which the tension means employed are thoroughly housed and protected within the interior of the tube, and in which the sliding gage is floatingly mounted while at the same time prevented from turning movement upon the calibrated rod.

These and other objects of the invention will more fully appear when taken in conjunction with the following description and the appended claims.

Figure 1:
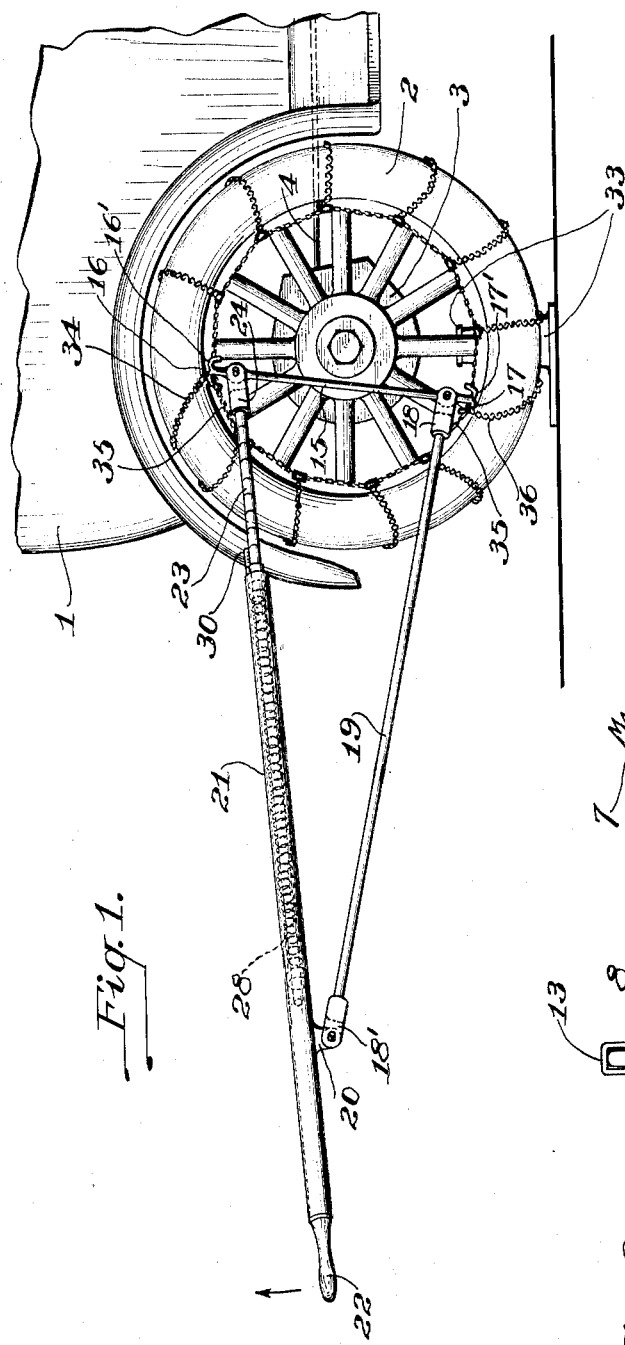
Figure 2:
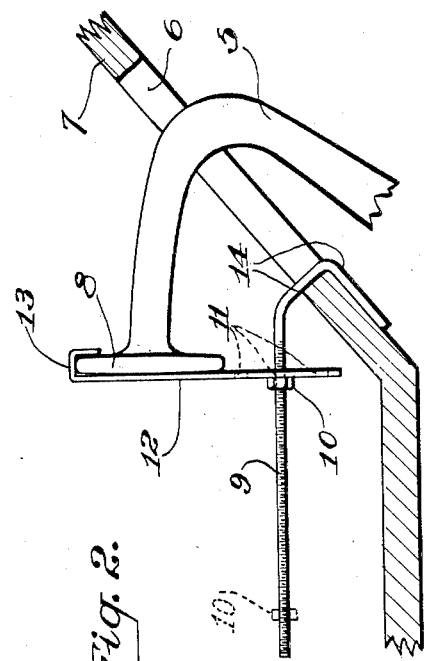

In the accompanying drawings forming a part of the application, Fig. 1 is a view in perspective showing the anchoring of the testing device to the rear wheel of a motor vehicle, as employed in actual use; Fig. 2 a fragmentary view, partially in section and partially in elevation, illustrating a special form of clamp particularly adapted for holding the brake pedal depressed during the testing of the brakes; Fig. 3 an enlarged fragementary detailed view, with parts in section, showing the structure and arrangement of the several parts of the testing device proper; Fig. 4 an elevation of one of the sides of the frame with the reverse anchoring hooks located at the opposite ends thereof; and Fig. 5 a fragmentary detailed view illustrating the cooperation between the rod and tubular sections of the side frame member of variable length, and illustrating the manner in which the floating indicating gage is used.

Referring to the drawings, the rear portion of the body of an automobile is indicated at 1, having the rear wheel 2 which is equipped with the customary brake mechanism indicated generally at 3, and adapted to be actuated by means of the brake rod 4 through means of the brake pedal 5, all as will be clear to those familiar with this art.

As clearly shown in Fig. 2, the brake pedal 5 projects upwardly through a suitable opening 6 in the floor board 7 and is equipped at its extremity with the customary enlarged terminal 8. The clamp for holding the brake pedal 5 in any desired position during the testing of the brakes in a manner to be described subsequently more in detail, includes the threaded rod-like body 9 equipped with the nut 10 which is adapted to be selectively projected through one of the apertures 11 provided at the lower end of a hooked clip 12 the upper portion of which is bent upon itself in the manner indicated at 13 so as to engage the enlarged terminal 8 of the brake member, in the manner shown in Fig. 2. The end of the body 9 disposed at the side of the clip 12 opposite the nut 10 is bent to hooked form as shown at 14 so that its free extremity will engage the under surface of the floor board 7 when projected through the aperture 6.

In using this holding clamp, the nut 10 is retracted to a point adjacent the end of the threaded part 9 so that the hooked portion 14 may be readily engaged with the floor board as clearly indicated in the drawings, while at the same time the portion 13 of the clip 12 may be engaged with the foot pedal when in its normal extended position, that is, with the enlarged terminal 8 at a substantial distance from the floor board 7. The nut 10 is then rotated so as to move it towards the floor board, until the parts are brought to a position in which the foot pedal 5 will be depressed to a sufficient extent to cause a substantial application of the brake mechanism 3.

The brake testing mechanism proper comprises a polygonal shaped frame, preferably triangular in shape as illustrated in the drawings, all but one of the side members of the frame being of fixed length, while the remaining side member is in the form of an extensible and contractible element, normally maintained at a predetermined length by means of suitable tension means. Referring particularly to Figs. 1, 3 and 4, 15 designates one of the sides of the frame having a fixed length, which is provided at its opposite extremities with pairs of anchoring hooks 16, 16' and 17, 17', the oppositely disposed pairs of hooks being reversely arranged. Hingedly connected to the side member 15, which is preferably of rod-like form, at a point adjacent the pair of hooks 17, 17', by means of a bifurcated yoke 18 is a side frame member 19 also of fixed length. The end of the side 19 opposite the yoke 18 is also equipped with a simliar bifurcated yoke 18' which hingedly engages with a lug 20 extending from the tubular section 21, the free end of which is fashioned in the form of a handle 22 adapted to be gripped by the operator during actuation of the device. The tubular section 21 cooperates with a rod-like section 23, equipped with a bifurcated yoke 24 hingedly connected to the side frame member 15 at a point adjacent the pair of hooks 16, 16', the sections 21 and 23 together forming the remaining extensible and contractible side member of the frame.

The interior of the tubular section 21 is equipped with a pair of spaced apart annular abutments 25 and 26, held in place by any suitable means such as the pins 25' and 26', respectively, the annulus 26 serving in part as a closure plug for the open end of the tube 21. The inner end of the rod 23 telescopically engages with the tubular section 21, neatly fitting the bores of the abutments 25 and 26, and being effectively guided thereby for easy sliding movement. The inner end of the rod 23 is also equipped with an abutment 27 suitably anchored thereto in any desired manner, and interposed between the abutments 25 and 27 is a coil compression spring 28.

The rod section 23 is provided with a guiding slot 29 for receiving one edge of a floating rider or indicating gage 30, the rider being bodily anchored to the rod by means of the split collar 31, the free ends of which are riveted or otherwise suitably fastened to the gage as clearly indicated at 32. For convenience, the portion of the rod 23 extending between the tubular section 21 and the yoke 24 is calibrated in any suitable terms of brake resistance, and the floating gage or rider 30 is sub-divided into any desirable number of sub-divisions the length of which corresponds to a predetermined fractional part of the length of the divisions provided upon the body of the rod section 23. The several parts are so disposed that when the spring 28 is fully extended with the abutments 26 and 27 in contact with each other, the terminal of the rider 30 remote from the tubular section 21 will be coincident with the first of the division marks of the scale upon the rod section 23.

The operation of the invention will now be described—Assuming the brake pedal 5 to be depressed to the desired extent to apply the brake mechanism 3 to a suitable degree, the wheel of the vehicle is slightly raised, as by means of the jack shown at 33. The frame of the testing device is then bodily anchored to the wheel. This can be very conveniently accomplished by equipping the wheel with any of the well known types of anti-skid chains, now upon the market, and suitably engaging the hooked extremities at the end of the side frame member 15 with portions of this chain. A very desirable anchoring can be effected by projecting one of the pair of hooks 16, 16' at the juncture of a transverse strand such as 34 and the side strand 35, located at the top portion of the wheel, while one of the pair of hooks 17, 17' is likewise engaged at the juncture of the transverse strand 36 and the side strand 35 at a point near the bottom of the wheel, all as clearly illustrated in Fig. 1 of the drawings. It is to be understood that when used in this manner, either one of the reversely arranged pairs of hooks 16, 17 or 16', 17', will be used depending upon the side of the vehicle at which the wheel being tested is located.

With the brake mechanism 3 applied, and the frame of the testing device attached to the wheel in the manner shown in Fig. 1, the operator grasps the handle portion 22 and lifts upwardly thereon until the wheel is rotated against the resistance of the brake. During such lifting movement the rod section 23 will be projected inwardly of the tubular section 21 against the tension of the spring 28, until the resistance offered by the spring corresponds substantially to that offered by the brake to rotative movement of the wheel.

Relative movement of the sections 21 and 23, during the lifting of the frame in the manner described, results in propelling the floating rider 30 along the rod section 23 in the direction of the hinged yoke 24. The rider thus indicates the extent of relative movement of the extensible and contractible side member of the frame produced by the lifting movement sufficient to overcome the brake resistance of the brake mechanism and it is obvious that by calibrating the scales provided upon the rod section 23 and the floating rider, such resistance may be readily read by the operator. By providing an indicating gage in the form of a floating rider, an indication of the change in the length of the extensible and contractible side frame member is maintained by the rider, even after the parts 21 and 23 have been returned to their normal positions by spring 28 after release of pressure by the operator upon the handle 22. In other words, the rider 30 maintains the position to which it has been moved during the braking test, such as indicated in Fig. 5 of the drawings, until it is again reset in juxtaposition to the abutment 26, as illustrated in Fig. 3.

As previously noted, by providing pairs of anchoring hooks at the opposite ends of the side frame member 15, the testing device may be readily applied at either side of the vehicle, and due to the extremely light weight of its entire construction, it can be easily handled or carried from place to place.

By alternately testing the opposite front or rear wheels of a vehicle, the ultimate desired setting of the respective brake mechanisms associated therewith may be readily accomplished so that the brake resistance offered at the two sides of the machine will substantially correspond, and by noting the degree of brake resistance at which the most desirable results are secured, readjustment may be made from time to time to keep the brakes adjusted at this point.

It is readily apparent that the invention not only supplies a highly efficient means for adjusting the brakes at the opposite sides of the vehicle to corresponding degrees of resistance, but is particularly valuable in affording a means whereby the relative resistances offered by the front and rear wheel brakes in four wheel systems may be determined and appropriately proportioned.

As required by the patent statutes the preferred embodiment of the invention has been illustrated and described. It is obvious, however, that many changes in details and in the specific arrangements of parts may be made without departing from the spirit of the invention. It is therefore not intended to limit the invention beyond that particularly defined by the appended claims.

I claim:

1. A brake testing device comprising a pair of telescopically engaged members, tension means cooperating with said members tending to maintain them in a predetermined relative relation to each other, one of said members being provided with anchoring means at exposed extremity, the remaining member being equipped with a handle portion adapted to be grasped by the operator, a rod pivotally connected at one end to the last named member and having anchoring means at its opposite end, and a floating gage riding upon one of said telescoped members and positioned in the path of movement of the other telescoped member.

2. A brake testing device comprising a triangular shaped frame the sides of which are hingedly connected adjacent their extremities, two of said sides being of fixed length, one of said sides of fixed length being provided with hooked ends serving as anchoring means for the frame, the remaining or third side being extensible and contractible so as to vary in length and comprising telescopically arranged sections resilient means opposing relative movement of said sections, one of said sections being provided with a floating indicating rider positioned in the path of movement of the remaining section and adapted to be engaged by the tubular section.

3. A brake testing device comprising a triangular shaped frame the sides of which are hingedly connected adjacent their extremities, two of said sides being of fixed length, one of said sides of fixed length being provided with an anchoring hook disposed at each end thereof, the hooks at the opposite ends being arranged in reversed relation, the remaining or third side being extensible and contractible so as to vary in length and comprising a tubular section and a rod section fitting telescopically into the first named section, tension means housed within the tubular section and tending to maintain said remaining section at a predetermined length, said rod section being calibrated and equipped with a floating rider slidingly mounted thereon and adapted to be engaged by the tubular section.

4. A brake testing device comprising a triangular shaped frame the sides of which are hingedly connected adjacent their extremities, two of said sides being of fixed length, one of said sides of fixed length being provided with an anchoring hook disposed at each end thereof, the hooks at the opposite ends being arranged in reversed relation, the remaining or third side being extensible and contractible so as to vary in length and comprising a tubular section and a rod section telescopically engaging the first named section, a pair of spaced annular abutments anchored in the tubular section, an abutment fixed to the rod section and disposed between the abutments on the tubular section, a coil spring encircling the rod section and disposed between the last named abutment and one of said first named abutments, said rod section being calibrated throughout its portion projecting beyond the tubular section and equipped with a guiding slot, and an indicating rider slidingly mounted upon the rod and engaging the said slot and adapted to be engaged by the tubular section.

5. A device for determining the resistance to rotation of a rotatable member, comprising a longitudinally collapsible compression member including resilient means for resisting such collapse, and means for connecting said compression member to a rotatable member so as to constitute with the compression member a lever for turning the rotatable member, said compression member being collapsible upon the application of force at one end thereof, and being further provided with means for indicating the force necessary to actuate said rotatable member.

6. A device for determining the resistance to rotation of a rotatable member, comprising a lever member consisting of two telescopic parts and a spring element resisting collapse of the member, means for securing the free end of one of said parts to a rotatable member at one point and another lever member for independently connecting the other of said parts to the rotatable member at a point remote from the point thereof first named.

In testimony whereof, I sign my name.

FRANCIS B. McKINNEY.